(12) United States Patent
Lukacs et al.

(10) Patent No.: US 9,117,080 B2
(45) Date of Patent: Aug. 25, 2015

(54) PROCESS EVALUATION FOR MALWARE DETECTION IN VIRTUAL MACHINES

(71) Applicant: Bitdefender IPR Management Ltd., Nicosia (CY)

(72) Inventors: Sandor Lukacs, Floresti (RO); Raul V. Tosa, Cluj-Napoca (RO); Paul Boca, Bistrita (RO); Gheorghe Hajmasan, Lunca Muressului (RO); Andrei V. Lutas, Satu Mare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 189 days.

(21) Appl. No.: 13/936,058

(22) Filed: Jul. 5, 2013

(65) Prior Publication Data

US 2015/0013008 A1   Jan. 8, 2015

(51) Int. Cl.
| | |
|---|---|
| *G06F 12/14* | (2006.01) |
| *G06F 21/56* | (2013.01) |
| *G06F 21/53* | (2013.01) |
| *G06F 9/455* | (2006.01) |

(52) U.S. Cl.
CPC .......... *G06F 21/566* (2013.01); *G06F 9/45558* (2013.01); *G06F 21/53* (2013.01); *G06F 2009/45587* (2013.01); *G06F 2221/2141* (2013.01); *G06F 2221/2149* (2013.01)

(58) Field of Classification Search
CPC ....... G06F 21/56; G06F 21/53; G06F 21/566; G06F 21/57; G06F 21/55; G06F 21/554; G06F 21/563; G06F 21/564; G06F 2009/45587; G06F 9/45558; G06F 9/45541; H04L 51/12; H04L 63/145

USPC ......... 726/24, 23, 22; 709/224; 713/164, 166; 718/1

See application file for complete search history.

(56) References Cited

U.S. PATENT DOCUMENTS

| | | | |
|---|---|---|---|
| 7,996,836 B1 | 8/2011 | McCorkendale et al. | |
| 8,099,596 B1 | 1/2012 | Rusakov et al. | |
| 8,387,046 B1 | 2/2013 | Montague et al. | |
| 2006/0236392 A1* | 10/2006 | Thomas et al. | 726/23 |
| 2010/0306849 A1* | 12/2010 | Zheng et al. | 726/24 |

OTHER PUBLICATIONS

Garfinkel (2003). A virtual machine introspection based architecture for intrusion detection, in Network and Distributed System Security Symposium, San Diego, CA.*

(Continued)

*Primary Examiner* — Brian Shaw
(74) *Attorney, Agent, or Firm* — Law Office of Andrei D Popovici, PC (57) ABSTRACT

Described systems and methods allow protecting a computer system from malware, such as viruses and rootkits. An anti-malware component executes within a virtual machine (VM) exposed by a hypervisor executing on the computer system. A memory introspection engine executes outside the virtual machine, at the processor privilege level of the hypervisor, and protects a process executing within the virtual machine by write-protecting a memory page of the respective process. By combining anti-malware components executing inside and outside the respective VM, some embodiments of the present invention may use the abundance of behavioral data that inside-VM components have access to, while protecting the integrity of such components from outside the respective VM.

20 Claims, 8 Drawing Sheets

(56) References Cited

OTHER PUBLICATIONS

BitDefender, "BitDefender Active Virus Control: Proactive Protection Against New and Emerging Threats", whitepaper, p. 1-10, BitDefender, Bucharest Romania, Oct. 11, 2011.
Zaharia et al., "Hypervisors as a Foothold for Personal Computer Security: An Agenda for the Research Community," Technical Report No. UCB/EECS-2012-12, p. 1-7, EECS Department, University of California, Berkeley, CA; Jan. 13, 2012.
Srivastava, "Robust and Secure Monitoring and Attribution of Malicious Behaviors," thesis presented to the Academic Faculty in partial fulfilment of the requirements for the Degree Doctor of Philosophy in the School of Computer Science, p. 1-165, Georgia Institute of Technology, Atlanta, GA; Aug. 2011.

* cited by examiner

PROCESS EVALUATION FOR MALWARE DETECTION IN VIRTUAL MACHINES

BACKGROUND

The invention relates to systems and methods for protecting computer systems from malware, and in particular to anti-malware systems employing hardware virtualization technology.

Malicious software, also known as malware, affects a great number of computer systems worldwide. In its many forms such as computer viruses, worms, and rootkits, malware presents a serious risk to millions of computer users, making them vulnerable to loss of data and sensitive information, identity theft, and loss of productivity, among others.

Hardware virtualization technology allows the creation of simulated computer environments commonly known as virtual machines, which behave in many ways as physical computer systems. In typical applications such as server consolidation and infrastructure-as-a-service (IAAS), several virtual machines may run simultaneously on the same physical machine, sharing the hardware resources among them, thus reducing investment and operating costs. Each virtual machine may run its own operating system and/or software applications, separately from other virtual machines. Due to the steady proliferation of malware, each virtual machine operating in such an environment potentially requires malware protection.

A virtualization solution commonly used in the art comprises a hypervisor, also known as a virtual machine monitor, consisting of a layer of software operating between the computing hardware and the operating system (OS) of a virtual machine, and having more processor privileges than the respective OS. Since some malware, such as rootkits, operate at OS privilege level, there is interest in developing anti-malware solutions executing at the privilege level of the hypervisor.

SUMMARY

According to one aspect, a host system comprises at least one processor configured to execute: a hypervisor configured to expose a virtual machine; a process evaluator executing within the virtual machine; a memory introspection engine executing outside the virtual machine; and a process-scoring module. The process evaluator is configured to determine whether an evaluated process executing within the virtual machine performs an action, and in response, when the evaluated process performs the action, transmit a first process evaluation indicator to the process-scoring module, the first process evaluation indicator determined for the evaluated process. The memory introspection engine is configured to intercept a call to an operating system function, to detect a launch of a protected process executing within the virtual machine, wherein the operating system function is configured to add the protected process to a list of processes executing within the virtual machine, and in response to detecting the launch, determine whether the evaluated process attempts to modify a memory page of the protected process, and in response, when the evaluated process attempts to modify the memory page, transmit a second process evaluation indicator to the process-scoring module, the second process evaluation indicator determined for the evaluated process. The process-scoring module is configured to receive the first and second process evaluation indicators, and in response, to determine whether the evaluated process is malicious according to the first and second process evaluation indicators.

According to another aspect, a non-transitory computer-readable medium encodes instructions which, when executed on a host system comprising at least one processor, cause the host system to form: a hypervisor configured to expose a virtual machine; a process evaluator executing within the virtual machine; a memory introspection engine executing outside the virtual machine; and a process-scoring module. The process evaluator is configured to determine whether an evaluated process executing within the virtual machine performs an action, and in response, when the evaluated process performs the action, transmit a first process evaluation indicator to the process-scoring module, the first process evaluation indicator determined for the evaluated process. The memory introspection engine is configured to intercept a call to an operating system function, to detect a launch of a protected process executing within the virtual machine, wherein the operating system function is configured to add the protected process to a list of processes executing within the virtual machine, and in response to detecting the launch, determine whether the evaluated process attempts to modify a memory page of the protected process, and in response, when the evaluated process attempts to modify the memory page, transmit a second process evaluation indicator to the process-scoring module, the second process evaluation indicator determined for the evaluated process. The process-scoring module is configured to receive the first and second process evaluation indicators, and in response, to determine whether the evaluated process is malicious according to the first and second process evaluation indicators.

According to another aspect, a method comprises employing at least one processor of a host system to receive a first process evaluation indicator determined for an evaluated process, the evaluated process executing within a virtual machine exposed by a hypervisor executing on the host system. The method further comprises employing the at least one processor to receive a second process evaluation indicator determined for the evaluated process, and in response to receiving the first and second process evaluation indicators, employing the at least one processor to determine whether the evaluated process is malicious according to the first and second process evaluation indicators. Determining the first process evaluation indicator comprises employing a process evaluator executing within the virtual machine to determine whether the evaluated process performs a first action. Determining the second process evaluation indicator comprises employing a memory introspection engine executing outside the virtual machine to determine whether the evaluated process performs a second action.

According to another aspect, a method comprises employing at least one processor of a host system to execute a memory introspection engine, the memory introspection engine executing outside a virtual machine exposed by a hypervisor executing on the host system, wherein executing the memory introspection engine comprises detecting a launch of a process executing within the virtual machine. The method further comprises, in response to the memory introspection engine detecting the launch of the process, employing the at least one processor to determine a first and a second process evaluation indicators of the process. The method further comprises, in response to determining the first and second evaluation indicators, employing the at least one processor to determine whether the process is malicious according to the first and second process evaluation indicators.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a process represents an instance of a computer program, wherein a computer program is a sequence of instructions determining a computer system to perform a specified task. Unless otherwise specified, a page represents the smallest unit of virtualized physical memory individually mapped to a physical memory of a computer system. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
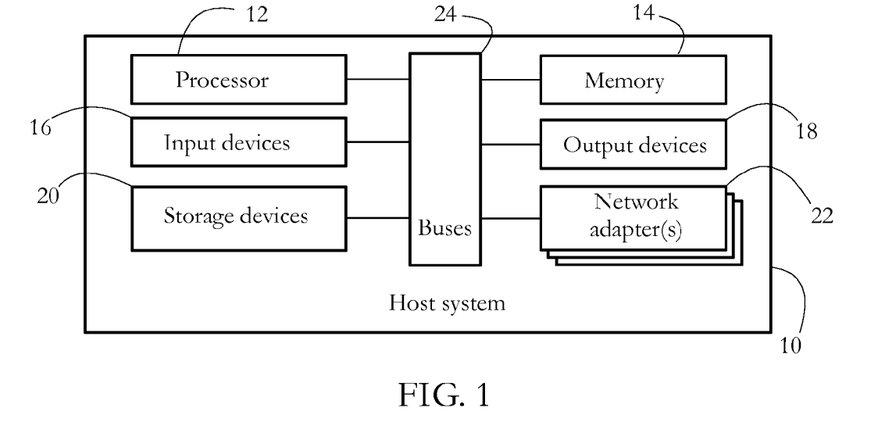
FIG. 1 shows an exemplary hardware configuration of a host computer system protected from malware according to some embodiments of the present invention.

FIG. 1 shows an exemplary hardware configuration of a host system 10 performing anti-malware operations according to some embodiments of the present invention. Host system 10 may represent a corporate computing device such as an enterprise server, or an end-user device such as a personal computer or a smartphone, among others. Other host systems include entertainment devices such as TVs and game consoles, or any other device having a memory and a processor supporting virtualization, and requiring malware protection. FIG. 1 shows a computer system for illustrative purposes; other client devices such as mobile telephones or tablets may have a different configuration. In some embodiments, system 10 comprises a set of physical devices, including a processor 12, a memory unit 14, a set of input devices 16, a set of output devices 18, a set of storage devices 20, and a set of network adapters 22, all connected by a set of buses 24.

In some embodiments, processor 12 comprises a physical device (e.g. multi-core integrated circuit) configured to execute computational and/or logical operations with a set of signals and/or data. In some embodiments, such logical operations are delivered to processor 12 in the form of a sequence of processor instructions (e.g. machine code or other type of software). Memory unit 14 may comprise volatile computer-readable media (e.g. RAM) storing data/signals accessed or generated by processor 12 in the course of carrying out instructions. Input devices 16 may include computer keyboards, mice, and microphones, among others, including the respective hardware interfaces and/or adapters allowing a user to introduce data and/or instructions into system 10. Output devices 18 may include display devices such as monitors and speakers among others, as well as hardware interfaces/adapters such as graphic cards, allowing system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of software instructions and/or data. Exemplary storage devices 20 include magnetic and optical disks and flash memory devices, as well as removable media such as CD and/or DVD disks and drives. The set of network adapters 22 enables system 10 to connect to a computer network and/or to other devices/computer systems. Buses 24 collectively represent the plurality of system, peripheral, and chipset buses, and/or all other circuitry enabling the inter-communication of devices 12-22 of host system 10. For example, buses 24 may comprise the northbridge connecting processor 12 to memory 14, and/or the southbridge connecting processor 12 to devices 16-22, among others.

Figure 2:
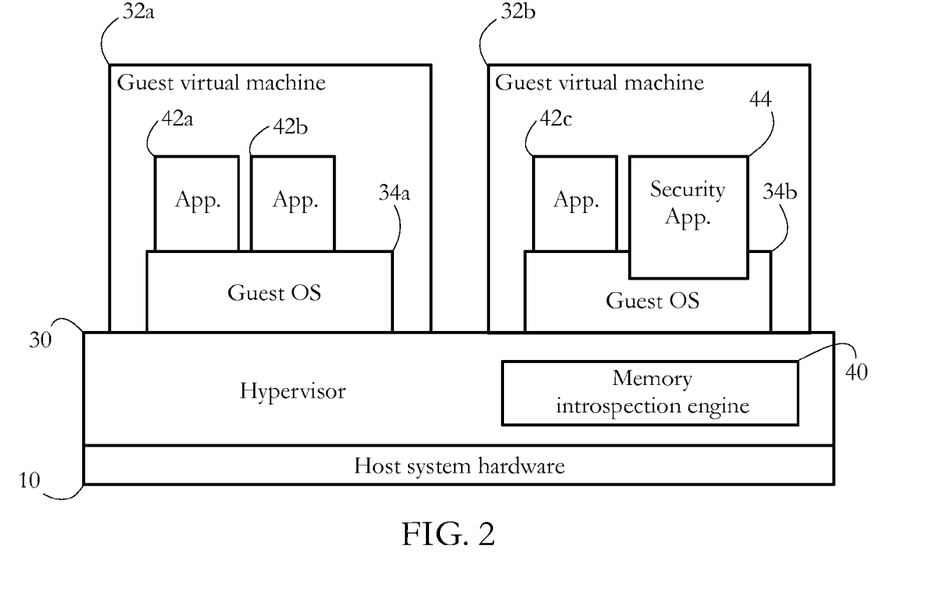
FIG. 2 shows an exemplary set of virtual machines exposed by a hypervisor executing on the host system of FIG. 1, and a security application operating in conjunction with a memory introspection engine to protect a virtual machine according to some embodiments of the present invention.

FIG. 2 shows an exemplary set of guest virtual machines 32a-b executing on host system 10 and exposed by a hypervisor 30 according to some embodiments of the present invention. Virtual machines (VM) are commonly known in the art as software emulations of actual physical machines/ computer systems, each capable of running its own operating system and software independently of other VMs. Hypervisor 30 comprises software allowing the multiplexing (sharing) by multiple virtual machines of hardware resources of host system 10, such as processor operations, memory, storage, input/output, and networking devices. In some embodiments, hypervisor 30 enables multiple virtual machines and/or operating systems (OS) to run concurrently on host system 10, with various degrees of isolation. To enable such configurations, software forming part of hypervisor 30 may create a plurality of virtualized, i.e., software-emulated devices, each virtualized device emulating a physical hardware device of system 10, such as processor 12 and memory 14, among others. Hypervisor 30 may further assign a set of virtual devices to each VM operating on host system 10. Thus, each VM 32a-b operates as if it possesses its own set of physical devices, i.e., as a more or less complete computer system. Examples of popular hypervisors include the VMware vSphere™ from VMware Inc. and the open-source Xen hypervisor, among others.

In some embodiments, hypervisor 30 includes a memory introspection engine 40, configured to perform anti-malware operations as described further below. Engine 40 may be incorporated into hypervisor 30, or may be delivered as a software component distinct and independent from hypervisor 30, but executing at substantially similar processor privilege level as hypervisor 30. A single engine 40 may be configured to malware-protect multiple VMs executing on host system 10.

While FIG. 2 shows just two VMs 32a-b for simplicity, host system 10 may operate a large number, e.g. hundreds, of VMs concurrently, and the number of such VMs may change during the operation of host system 10. In some embodiments, each VM 32a-b executes a guest operating system 34a-b and/or a set of software applications 42a-b, 42c, and 44, respectively, concurrently and independently of other VMs running on host system 10. Each OS 34a-b comprises software that provides an interface to the (virtualized) hardware of the respective VM 32a-b, and acts as a host for software applications executing on the respective OS. Operating systems 34a-b may comprise any widely available operating system such as Windows®, MacOS®, Linux®, iOS®, or Android™, among others. Applications 42a-c may include word processing, image processing, database, browser, and electronic communication applications, among others. In the following description, software executing on a virtual processor of a virtual machine is said to execute within the respective virtual machine. For instance, in FIG. 2, application 42b is said to execute within VM 32a, while application 42c is said to execute within VM 32b. In contrast, memory introspection engine 40 is said to execute outside VMs 32a-b.

In the example of FIG. 2, a security application 44 executes on guest OS 34b, application 44 configured to perform anti-malware (AM) operations in conjunction with memory introspection engine 40, as detailed below, to protect virtual machine 32b from malware. In some embodiments, an instance of application 44 may execute on each of a plurality of VMs operating on host system 10, each such instance configured to interface with introspection engine 40 to protect the respective virtual machine. Security application 44 may be a standalone program, or may form part of a software suite comprising, among others, anti-malware, anti-spam, and anti-spyware components.

Figure 3:
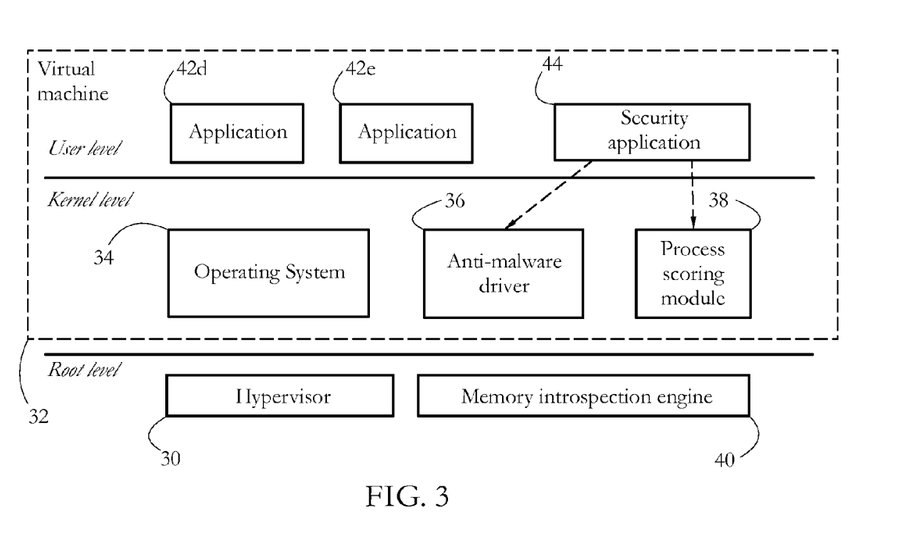
FIG. 3 illustrates an exemplary hierarchy of software objects executing on the host system at various processor privilege levels, including a set of anti-malware objects according to some embodiments of the present invention.

FIG. 3 illustrates a hierarchy of software objects executing on host system 10 according to some embodiments of the present invention. FIG. 3 is represented from the perspective of processor privilege levels, also known in the art as layers or protection rings. In some embodiments, each such layer or protection ring is characterized by a set of instructions, which a software object executing at the respective processor privilege level is allowed to execute. When a software object attempts to execute an instruction, which is not allowed within the respective privilege level, the attempt may trigger a processor event, such as an exception, a fault, or a virtual machine exit event. In some embodiments, switching between privilege levels may be achieved via a set of dedicated instructions. Such exemplary instructions include SYSCALL/SYSENTER, which switch from user level to kernel level, SYSRET/SYSEXIT, which switch from kernel level to user level, VMCALL, which switches from either user or kernel level to root level, and VMRESUME, which switches from root level to either kernel or user level.

In some embodiments, hypervisor 30 takes control of processor 12 at the most privileged level (e.g., VMXroot on Intel® platforms supporting virtualization, and also known as ring −1 or root mode), thus creating a hardware virtualization platform presented as a virtual machine 32 to other software executing on host system 10. An operating system 34, such as OSs 34a-b in FIG. 2, executes within the virtual environment of VM 32, OS 34 having lesser processor privilege than hypervisor 30 (e.g., ring 0 on Intel platforms, or kernel mode). A set of applications 42d-e execute at lesser processor privilege than OS 34 (e.g., ring 3, or user mode).

In some embodiments, parts of security application 44 may execute at user-level processor privilege, i.e., same level as applications 42d-e. For instance, such parts may comprise a graphical user interface informing a user of any malware or security threats detected on the respective VM, and receiving input from the user indicating, e.g., a desired configuration option for application 44. Another example of a component executing at user level is a user-level process evaluator, as detailed below. Other parts of application 44 may execute at kernel privilege level. For instance, application 44 may install an anti-malware driver 36 and a process scoring module 38, both operating in kernel mode. An exemplary AM driver 36 provides functionality to anti-malware application 44, e.g. to scan memory for malware signatures and/or to detect malware-indicative behavior of processes and/or other software objects executing on OS 34.

In some embodiments, process-scoring module 38 is configured to receive process evaluation data from a plurality of software components, the process evaluation data determined for an evaluated process, and to determine whether the evaluated process is malicious according to the respective data. A process is an instance of a computer program, such as an application or a part of an operating system, and is characterized by having at least an execution thread and a section of virtual memory assigned to it by the operating system, the respective section comprising executable code. In some embodiments, the operating system manages processes currently executing on host system 10 (or within virtual machine 32, in the case of virtualization), such management including, among others, assigning virtual memory to each process and scheduling each process or thread thereof for execution.

Figure 4:
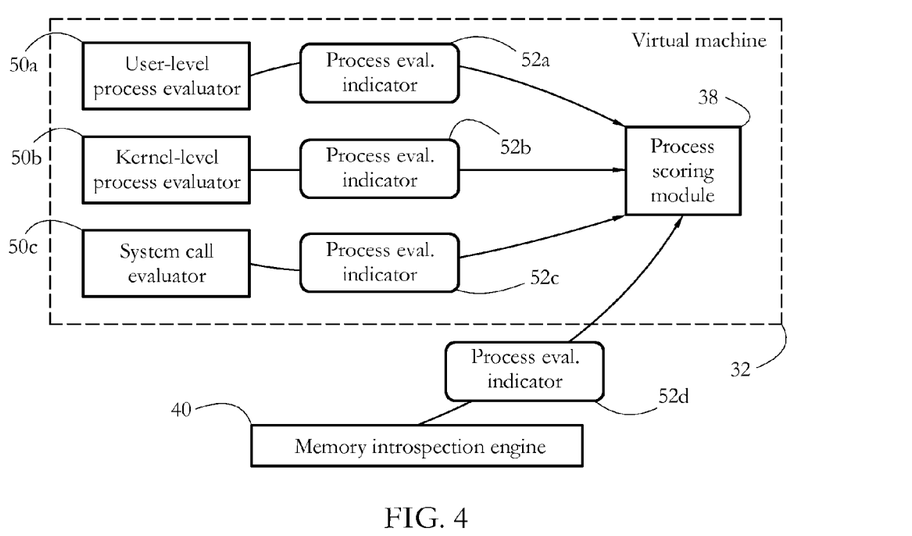
FIG. 4 shows an exemplary process-scoring module receiving a plurality of process evaluation indicators determined for a process by a plurality of process evaluators, according to some embodiments of the present invention.

FIG. 4 shows an exemplary process-scoring module 38 receiving a plurality of process evaluation indicators 52a-d, each indicator 52a-d determined by a process evaluator component. In FIG. 4, such evaluation components include a user-level process evaluator 50a, a kernel-level process evaluator 50b, and a system call evaluator 50c, among others. Evaluators 50a-c may be set up by, or form part of anti-malware driver 36. Each such evaluator may execute independently of other evaluators, and each may determine a plurality of distinct process evaluation indicators of the evaluated process. The operation of evaluators 50*a-c* will be detailed further below. In some embodiments, some process evaluation indicators, such as indicators 52*a-c* in FIG. 4, are determined by components executing within VM 32, while other process evaluation indicators, such as 52*d*, are determined by components executing outside VM 32 (for instance, by memory introspection engine 40).

Some evaluation indicators may be malware-indicative, i.e., may indicate that the evaluated process is malicious. Some evaluation indicators may not be malware-indicative themselves, but may indicate maliciousness when combined with other evaluation indicators. Each evaluation indicator 52*a-d* may be determined according to a distinct method or criterion. An exemplary process evaluation indicator determined for an evaluated process may include, for instance, a behavioral indicator, indicating whether the evaluated process performed, or attempted to perform, a certain action, such as editing a system register key of VM 32, or writing to a memory page belonging to a protected software object. Another exemplary process evaluation indicator may indicate whether a section of memory belonging to the evaluated process contains a malware-indicative signature. In some embodiments, each process evaluation indicator 52*a-d* comprises a process identification indicator, such as a process ID, a label, or a hash index, allowing module 38 to identify the process for which the respective indicator was determined.

In some embodiments, a process evaluation indicator may comprise a numerical score determined by the respective process evaluator, the score indicative of a degree of maliciousness of the respective process. Alternatively, such scores may be determined by module 38 according to process evaluation indicators 52*a-d*. Maliciousness scores may be binary (1/0, yes/no), or may vary over a continuous range of values. An exemplary maliciousness score that may vary within a range of values comprises a number indicative of a likelihood (e.g., probability) that the evaluated process is malicious; such a score may vary, for instance, between 0 and 1, or between 0% and 100%. Score values may be behavior-specific. For example, an evaluated process may receive a maliciousness score of 0.2 when it creates a disk file, and a maliciousness score of 0.7 when it modifies a Windows registry value.

Figure 5:
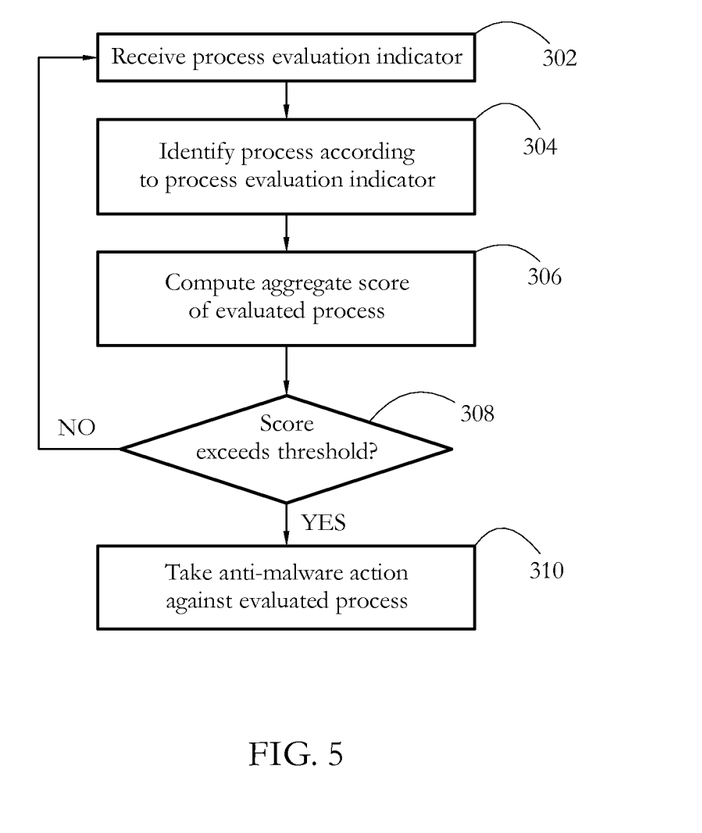
FIG. 5 shows an exemplary sequence of steps performed by the process-scoring module of FIG. 4 according to some embodiments of the present invention.

FIG. 5 shows an exemplary sequence of steps executed by process scoring module 38 according to some embodiments of the present invention. In a step 302, module 38 receives a process evaluation indicator, such as indicators 52*a-d* in FIG. 4, from a process evaluator which may operate either within VM 32 (see e.g., evaluators 50*a-c* in FIG. 4), or outside VM 32 (e.g., memory introspection engine 40). In a step 304, module 38 may identify the process for which the respective process evaluation indicator was determined. In some embodiments, process scoring module 38 may keep a per-process record of all process evaluation indicators received from various process evaluators; step 304 may further comprise adding the indicator received in step 302 to the record of the respective process.

To determine whether an evaluated process is malicious, in a step 306, process scoring module 38 may determine an aggregate score by combining individual scores determined for the respective process, and received from various process evaluators. Exemplary aggregate scores comprise a weighted sum and a weighted average of individual scores. In some embodiments, the aggregate score may combine process evaluation indicators/scores determined for the evaluated process with process evaluation indicators/scores determined for other processes or software objects. For instance, scores determined for the evaluated process may be combined with scores determined for a child process of the evaluated process, and/or with scores determined for a parent process of the evaluated process.

In a step 308, module 38 may compare the aggregate score to a predetermined threshold. When the aggregate score does not exceed the threshold, module 38 may return to step 302 described above. In some embodiments, the threshold may be set to a value determined according to an input received from a user of the respective VM (e.g., through a user interface exposed by security application 44). Threshold values may reflect the respective user's security preferences. For instance, when the user opts for tight security, the threshold may be set to a relatively low value; when the user prefers a more tolerant security setting, the threshold may be set to a relatively high value. In some embodiments, the threshold value may be received from a remote security server, as described below in relation to FIGS. 10-11.

In some embodiments, in steps 306-308, process-scoring module 38 may determine a plurality of aggregate scores, and compare each aggregate score to a (possibly distinct) threshold. Each such aggregate score may be determined according to a distinct subset of process evaluation indicators. In an exemplary embodiment, each such set of process evaluation indicators may represent a particular class or type of malware (e.g., Trojans, rootkits, etc.), allowing module 38 to perform a classification of the detected malware.

When the aggregate score exceeds the threshold, in a step 310, module 38 may decide that the evaluated process is malicious, and may take anti-malware action. In some embodiments, such anti-malware action may include, among others, terminating the evaluated process, quarantining the evaluated process, and removing or disabling a resource (such as a file or a section of memory) of the evaluated process. In some embodiments, anti-malware action may further comprise alerting a user of host system 10, and/or alerting a system administrator, for instance by sending a message to the system administrator over a computer network connected to host system 10 via network adapter(s) 22. In some embodiments, anti-malware action may also comprise sending a security report to a remote security server, as described below in relation to FIGS. 10-11.

The exemplary process-scoring module 38 depicted in FIGS. 3-4 operates within VM 32 at OS processor privilege level (e.g., kernel mode). In alternative embodiments, process-scoring module 38 may execute within VM 32 in user mode, or even outside VM 32, at the processor privilege level of hypervisor 30.

In some embodiments, introspection engine 40 executes substantially at the same privilege level as hypervisor 30, and is configured to perform introspection of virtual machines such as VM 32. Introspection of a VM, or of a software object executing on the respective VM, may comprise analyzing a behavior of the software object, determining and/or accessing memory addresses of such software objects, restricting access of certain processes to a content of memory located at such addresses, analyzing such content, and determining process evaluation indicators of the respective software objects (e.g., indicator 52*d* in FIG. 4), among others. In some embodiments, software objects targeted by introspection engine 40 comprise processes, instruction streams, registers, and data structures such as page tables and driver objects of the respective VM, among others.

To perform introspection of VM 32 from outside the respective VM, some embodiments of engine 40 employ memory mapping structures and mechanisms of processor 12. Virtual machines typically operate with a virtualized physical memory, i.e., a virtual representation of the actual physical memory 14 of host system 10. Virtualized physical memory comprises a contiguous space of virtualized addresses, specific to each guest VM executing n host system 10, with parts of the respective space mapped to addresses within physical memory 14 and/or physical storage devices 20. In systems configured to support virtualization, such mapping is typically achieved by dedicated data structures controlled by processor 12, such as extended page tables (EPT) or nested page tables (NPT). In such systems, virtualized physical memory may be partitioned in units known in the art as pages. A page represents the smallest unit of virtualized physical memory individually mapped to physical memory via mechanisms such as EPT and/or NPT, i.e., mapping between physical and virtualized physical memory is performed with page granularity. All pages typically have a predetermined size, e.g., 4 kilobytes, 2 megabytes, etc. The partitioning of virtualized physical memory into pages is usually configured by hypervisor 30. In some embodiments, hypervisor 30 also configures the EPT/NPT and therefore the mapping between physical memory and virtualized physical memory. The actual translation of a virtualized physical memory address to a physical memory address may comprise looking up the physical memory address in a translation lookaside buffer (TLB) of host system 10. In some embodiments, address translation comprises performing a page walk, which includes a set of successive address look-ups in a set of page tables, and performing calculations such as adding an offset of a page to an address relative to the respective page.

Some hardware configurations allow hypervisor 30 to selectively control access to data stored within each page, e.g., by setting read and write access rights to the respective page. Such rights may be set, for instance, by modifying an entry of the respective page within the EPT or NPT. Hypervisor 30 may thus select which software object may access data stored at the addresses within each page, and may indicate which operations are allowed with the respective data, e.g., read, write, etc. An attempt by a software object executing within a VM to perform an operation, such as reading data from, or writing data to a page to which the object does not have the respective right, may trigger a virtual machine exit event (e.g. a VMExit event on Intel platforms). In some embodiments, virtual machine exit events transfer control of the processor from the VM executing the respective software object to hypervisor 30 or to memory introspection engine 40, thus allowing hypervisor 30 and/or engine 40 to intercept and analyze the unauthorized read/write attempt.

In some embodiments, OS 34 configures a virtual memory space (also termed logical address space) and exposes the virtual memory space to an application such as applications 42d-e and 44 in FIG. 3. In such systems, OS 34 configures and maintains a mapping between the virtual memory space and the virtualized physical memory of VM 32, for instance using a page table mechanism. In some embodiments, the virtual memory space is also partitioned into pages, such pages representing the smallest unit of virtual memory individually mapped to virtualized physical memory by OS 34 (virtual to virtualized physical memory mapping is performed with page granularity).

Figure 6:
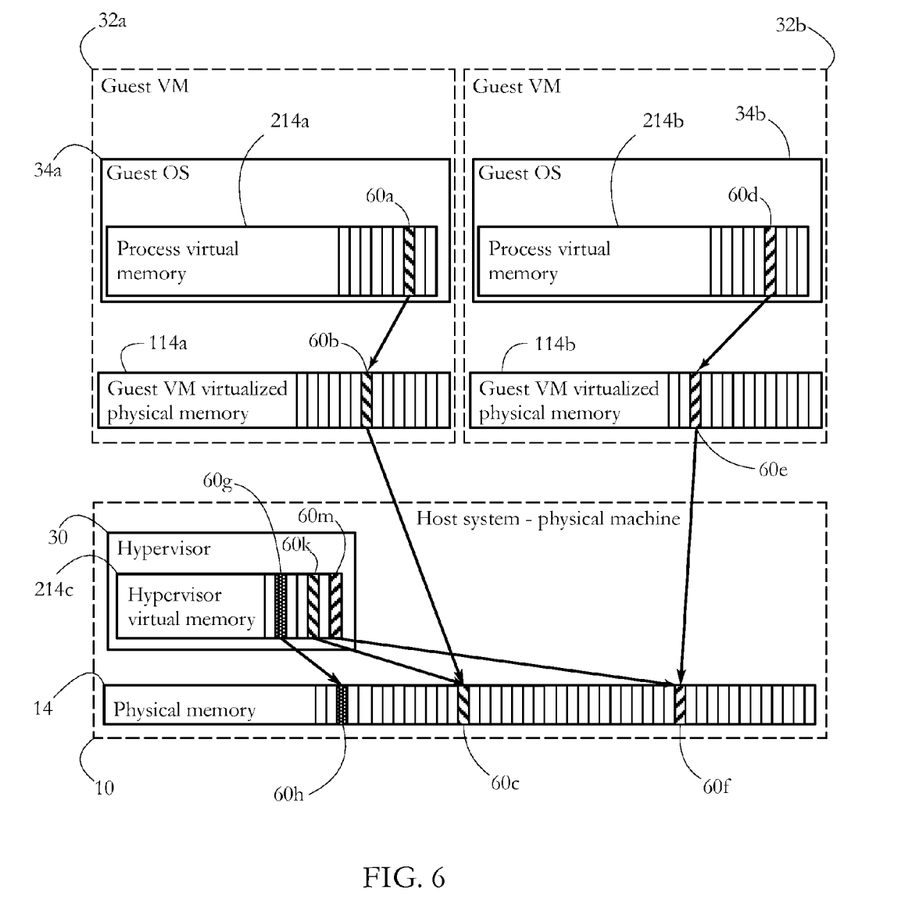
FIG. 6 shows an exemplary mapping of memory addresses in the system configuration of FIG. 2, according to some embodiments of the present invention.

FIG. 6 illustrates an exemplary mapping (translation) of memory addresses in an embodiment as shown in FIG. 2. A software object, such as an application or a process executing within VM 32a, is assigned a virtual address space 214a by guest OS 34a. When the respective software object attempts to access an exemplary memory address 60a of space 214a, address 60a is translated by the virtualized processor of guest VM 32a, according to page tables configured and controlled by guest OS 34a, into an address 60b within a virtualized physical memory space 114a of virtual machine 32a. Address 60b is also known in the art as a guest-physical address. Hypervisor 30, which configures and controls virtualized physical memory 114a, maps address 60b to an address 60c within physical memory 14 of host system 10, for instance using EPT or NPT means, as discussed above.

Similarly, a virtual memory space 214b is set up by guest OS 34b for applications (e.g. 42c) or other software objects executing on guest VM 32b. An exemplary virtual address 60d within space 214b is translated by the virtualized processor of guest VM 32b, according to page tables configured and controlled by guest OS 34b, into an address 60e within a virtualized physical memory space 114b of guest VM 32b. Address 60e is further mapped by hypervisor 30 into an address 60f within physical memory 14.

In some embodiments, hypervisor 30 sets up its own virtual memory space 214c comprising a representation of physical memory 14, and employs a translation mechanism (for instance, page tables) to map addresses in space 214c into addresses in physical memory 14. In FIG. 6, such an exemplary mapping translates an address 60g into an address 60h. Similarly, addresses such as 60c and 60f in physical memory 14 correspond to addresses 60k and 60m, respectively, within virtual memory space 214c of hypervisor 30. Such translation allows hypervisor 30 to manage (e.g., read, write, and control access to) memory pages belonging to software objects executing within various VMs running on host system 10.

Figure 7:
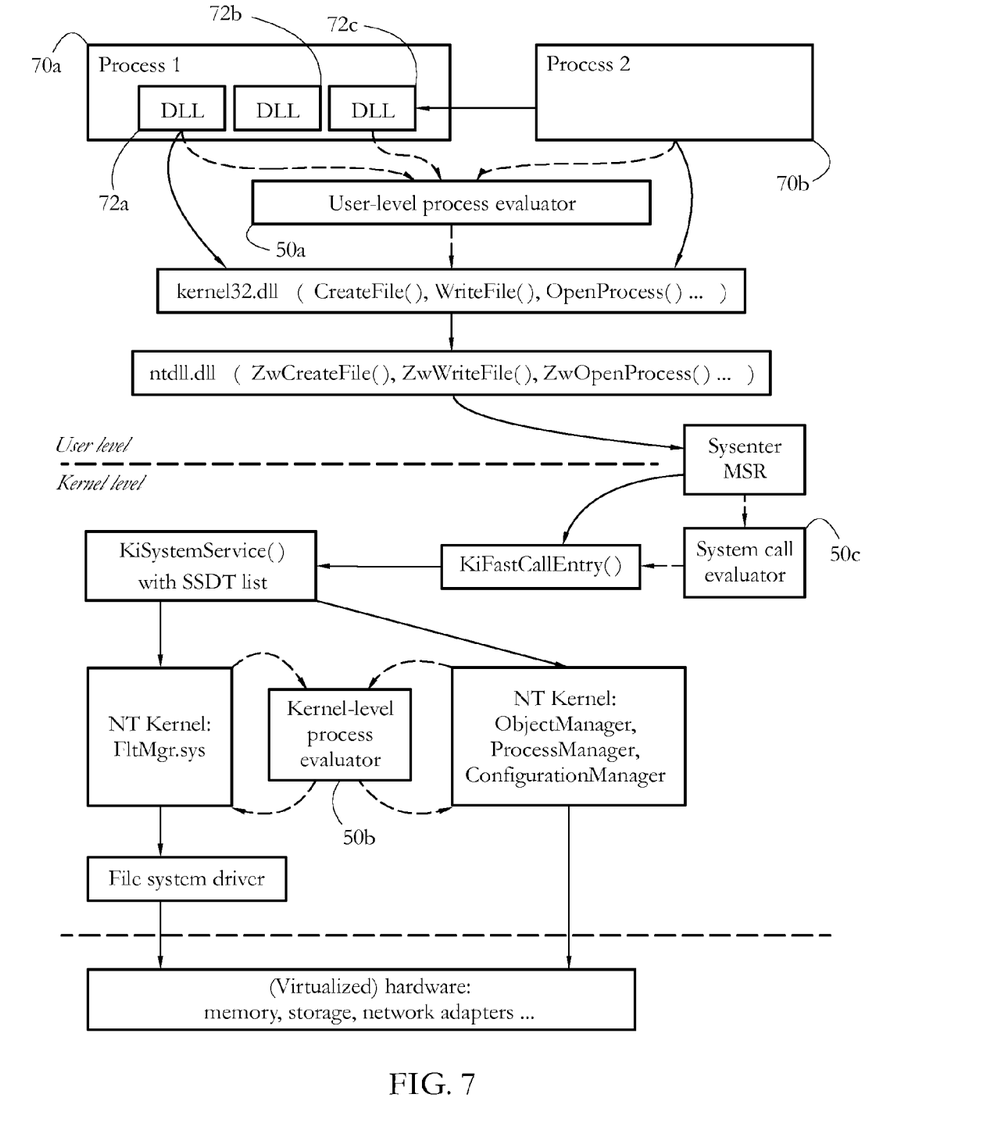
FIG. 7 illustrates an exemplary execution flow of a set of processes in a Windows® environment. Solid arrows indicate an exemplary execution flow in the absence of an anti-malware system. Dashed arrows indicate modifications to the execution flow, the modifications introduced by a plurality of process evaluators operating according to some embodiments of the present invention.

FIG. 7 illustrates an exemplary execution flow of a set of processes 70a-b executing on a VM 32 according to some embodiments of the present invention. The example of FIG. 7 shows the execution flow in a system running a version of the Windows® OS; similar diagrams may be rendered for other operating systems such as Linux, for instance. Solid arrows represent the execution flow in the absence of an anti-malware system such as security application 44. Dashed arrows represent modifications to the flow due to the presence of process evaluators executing according to some embodiments of the present invention.

Process 70a comprises a plurality of dynamic-linked libraries (DLLs) 72a-c; in the example of FIG. 7, DLL 72c is injected into process 70a by (possibly malicious) process 70b. Code injection is a generic term used in the art to indicate a family of methods of introducing a sequence of code, such as a DLL, into the memory space of an existing process, to alter the original functionality of the respective process. When process 70a executes an instruction calling for some system functionality, e.g. to write something to a disk file, or to edit a registry key, the respective instruction calls a user-mode API such as KERNEL32.DLL or NTDLL.DLL. In the example of FIG. 7, the respective user-mode API call is intercepted and analyzed by user-level behavioral filter 50a. Such interceptions may be achieved by a method such as DLL injection or hooking, among others. Hooking is a generic term used in the art for a method of intercepting function calls, or messages, or events passed between software components. One exemplary hooking method comprises altering the entry point of a target function, by inserting an instruction redirecting execution to a second function. Following such hooking, the second function may be executed instead, or before, the target function. In the example of FIG. 7, anti-malware driver 36 may hook into certain functions of KERNEL32.DLL or NTDLL.DLL, to instruct the respective functions to redirect execution to filter 50a. Thus, filter 50a may detect that process 70a is attempting to perform a certain behavior, identified according to the function performing the redirection. When filter 50a detects such behavior, filter 50 may formulate process evaluation indicator 52a (FIG. 4) and transmit indicator 52a to process scoring module 38.

In a typical flow of execution, the user-mode API function may request service from the operating system's kernel. In some embodiments, such operations are performed by issuing a system call, such as SYSCALL and SYSENTER on x86 platforms. In the example of FIG. 7, such system calls are intercepted by system call evaluator 50c. In some embodiments, such interception comprises, for instance, modifying a system call handler routine by changing a value stored in a model-specific register (MSR) of processor 12, which effectively redirects execution to filter 50c. Such techniques are known in the art as MSR hooking, and may allow system call evaluator 50c to detect that the evaluated process is attempting to perform certain system calls. When such system calls are intercepted, system call filter 50c may formulate process evaluation indicator 52c and transmit indicator 52c to process scoring module 38.

Following the system call, control of the processor is typically turned over to the kernel of OS 34. In some embodiments, kernel-level process evaluator 50b is configured to intercept certain operations of the OS kernel, and therefore determine that the evaluated process is attempting to perform certain operations, which may be malicious. To intercept such operations, some embodiments may employ a set of filtering mechanisms built into and exposed by OS 34. For example, in a Windows OS, FltRegisterFilter may be used to intercept operations like creating, opening, writing to, and deleting a file. In another example, evaluator 50b may use ObRegisterCallback to intercept create or duplicate object-handle operations, or PsSetCreateProcessNotifyRoutine to intercept the creation of new processes. In yet another example, Windows registry operations such as creating and setting registry keys/values may be intercepted using CmRegisterCallbackEx. Similar filtering mechanisms are known in the art for other operating systems such as Linux®. When kernel-mode process evaluator 50b intercepts such operations, evaluator 50b may formulate process evaluation indicator 52b and transmit indicator 52b to process scoring module 38.

To transmit data such as process evaluation indicators 52a-c from evaluators 50a-c to scoring module 38, a person skilled in the art may employ any inter-process communication method. For instance, to communicate between user-mode and kernel-mode components, evaluators 50a-c and module 38 may be configured to use a shared section of memory.

Figure 8:
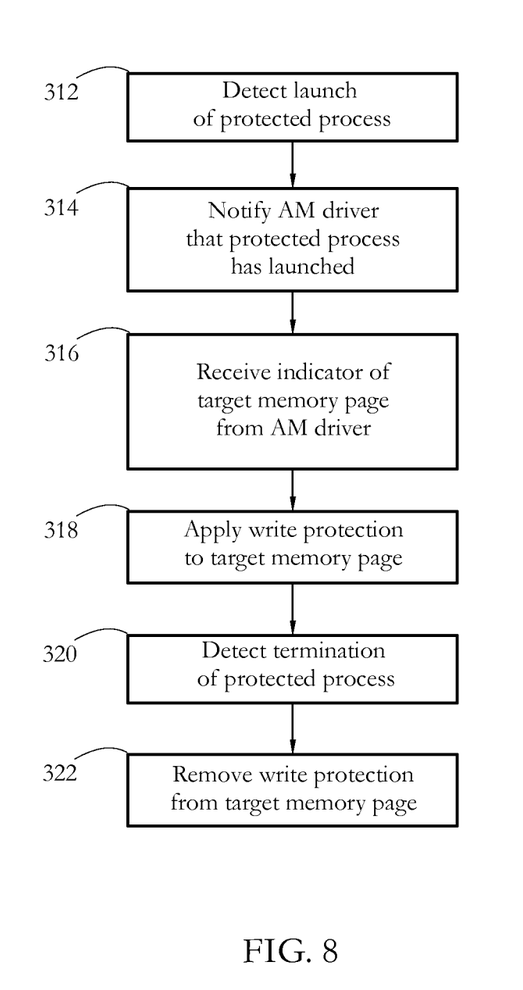
FIG. 8 illustrates an exemplary sequence of steps performed by the memory introspection engine of FIGS. 2-3 according to some embodiments of the present invention.

FIG. 8 shows an exemplary sequence of steps performed by memory introspection engine 40 according to some embodiments of the present invention. In a step 312, engine 40 may detect that a process requiring protection from malware (hereafter referred to as a protected process) is launching within VM 32. In some embodiments, such protected processes include, among others, processes belonging to security application 44.

To detect the launch of the protected process, engine 40 may employ data structures and/or mechanisms native to OS 34. For example, some versions of the Windows® OS manage processes using a list of active processes, maintained by the kernel. Each time a process is created, an indicator of the respective process is inserted into the list of active processes; the indicator is removed from the list upon termination of the respective process. In some embodiments, the kernel of OS 34 represents each process as a data structure, e.g., an executive process block (EPROCESS) in Windows, which comprises, among others, handles to each of the threads of the respective process, and a unique process ID allowing OS 34 to identify the respective process from a plurality of executing processes.

To detect the creation of the protected process (step 312 in FIG. 8), some embodiments hook into a kernel function which manipulates the list of active processes, using any hooking method known in the art. An example of such function of the Windows OS is PspInsertProcess, which adds a process to the list of active processes when the respective process is launched into execution. Some embodiments of AM driver 36 may apply a re-direction patch to the respective kernel function, such as a VMCALL instruction or a JMP instruction. Other embodiments may modify the EPT entry of the respective kernel function, to point to a new address. The effect of such patches and/or EPT hooks is to redirect execution of the native OS function to a fragment of code provided by memory introspection engine 40. Following hooking, when OS 34 attempts to launch a process into execution, the fragment of code will be executed before or instead of the code of the respective kernel function, thus notifying memory introspection engine 40 that the respective process is executing. In some embodiments, engine 40 may identify the respective process according to a parameter (e.g., the EPROCESS structure including the unique process ID) passed to the kernel function when the respective process is launched. An alternative embodiment may use a memory hook (such as an EPT hook) to gain access to an address of a section of memory storing the list of active processes, and according to a content of the respective memory section, further determining the address of the EPROCESS structure describing each process currently in execution.

In a step 314, memory introspection engine 40 may notify AM driver 36 that the protected process is executing. For instance, engine 40 may send an indicator such as the process ID of the protected process to AM driver 36. Next, in a step 316, engine 40 may receive from driver 36 an indicator of a memory page (for instance, an address of a page in virtual memory), the memory page storing code and/or data of the protected process. In some embodiments, engine 40 uses steps 314-316 to bridge a semantic gap, which appears because engine 40 executes outside VM 32, while the protected process executes within VM 32. AM driver 36, by executing in kernel mode within VM 32, may have direct access to information such as a memory address used by the protected process, e.g., an address of a page within the virtualized physical memory of the respective VM (see spaces 114a-b in FIG. 6) storing code and/or data of the protected process. Although hypervisor 30 may gain access to a list of active processes executing within the respective VM, parsing the list to determine all modules (such as DLLs) loaded by the respective process, and further determining all addresses of memory pages storing such data/code from the level of hypervisor 30 may require substantial computation. In some embodiments, another reason for the sequence of steps 314-316 is that data belonging to user-mode processes may be swapped by OS 34 between physical memory 14 and other computer-readable media, e.g., storage devices 20. Executing outside the respective VM, memory introspection engine 40 may detect that when data is swapped in and out of physical memory, but may not be able to access and/or protect such data while it does not reside in physical memory. In contrast, AM driver 36 executing within VM 32 may readily access a page which is swapped out of physical memory, by forcing OS 34 to load the respective page. AM driver 36 may thus efficiently list all modules used/loaded by the protected process, and determine the size and the location of such modules within the virtualized physical memory of VM 32.

In an alternative embodiment, instead of actively detecting the launch of the protected process (step 312 above), memory introspection engine 40 may receive an indicator of the protected process from AM driver 36, wherein AM driver 36 may actually detect the launch of the protected process from within VM 32. In such embodiments, step 314 as described above is no longer necessary. In yet another embodiment, in step 316, engine 40 may actually perform the necessary calculations to determine an address of the memory page of the protected process, instead of relying on AM driver 36 as described above.

In a step 318, memory introspection engine protects the target page from unwanted modification, for example by malicious software attempting to compromise VM 32. Several such memory protection mechanisms are known in the art. Protection may be enforced by hypervisor 30 at the request on memory introspection engine 40, using data structures such as the EPT or NPT. For instance, hypervisor 30 may set the target memory page as read-only, by modifying the EPT/NPT access right bits of the respective pages. In some embodiments, hypervisor 30 may intercept any attempt to write to the memory pages allocated to the target object, and re-direct the respective attempt to memory introspection engine 40 for analysis. The operation of engine 40 in step 318 will be further detailed below, in relation to FIG. 9.

To apply write-protection to the target page, step 318 may comprise performing a translation of memory addresses of the kind illustrated in FIG. 6, from a virtual memory space set up by OS 34 for the protected process, all the way to physical memory 14 of host system 10, or from a virtualized physical memory space of the respective VM to physical memory 14. The respective translation allows memory introspection engine 40 to determine an address of the target page in actual physical memory 14, according to the indicator received in step 316 from AM driver 36. Such translations may employ an EPT/NPT mechanism, as described in relation to FIG. 6.

In a step 320, engine 40 may detect a termination of the protected process. In some embodiments, step 320 may proceed in a manner similar to step 312 described above. For instance, step 320 may comprise receiving a signal from a kernel function configured to remove a process from the list of active processes of VM 32, the respective function modified by AM driver 36 by hooking (e.g., applying a patch, such as a VMCALL instruction, to the respective function, the patch redirecting execution to engine 40). An exemplary Windows function which may be modified in this way is PspDeleteProcess. When engine 40 detects termination of the protected process, a step 322 removes protection from the respective target page, e.g., by instructing hypervisor 30 to change the write permissions for the target page.

Figure 9:
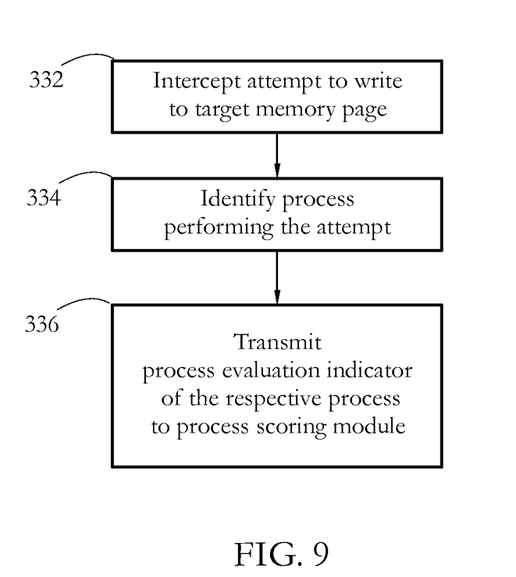
FIG. 9 shows an exemplary sequence of steps performed by the memory introspection engine to protect a memory page according to some embodiments of the present invention.

FIG. 9 illustrates a sequence of steps performed by memory introspection engine 40 to protect the target page (step 318 in FIG. 8). In a step 332, engine 40 may intercept an attempt to write to the target page; such attempts may be indicative of malicious intent, and may be intercepted via hypervisor 30, as described above. In a step 334, engine 40 may identify the process executing the attempt; the respective process will be referred to as the offending process. In some embodiments, to execute step 334, engine 40 may use a content of an instruction pointer register, such as the EIP and/or RIP registers on x86 systems, to identify the processor instruction (or address thereof) performing the attempt, and a content of a CR3 register to identify the process that the respective instruction belongs to. Alternatively, engine 40 may use a content of a segment register, such as the FS and GS registers on x86 processors, to identify the offending process according to certain kernel data structures, which are modified every time OS 34 switches execution between processes.

In a step 336, engine 40 may formulate process evaluation indicator 52d (see e.g., FIG. 4) of the offending process and transmit indicator 52d to process scoring module 38. An exemplary indicator 52d may comprise an indicator (e.g., process ID) of the offending process identified in step 334, and an indicator of a type of action attempted by the offending process, and intercepted in step 332 (e.g., an attempt to write to a protected memory page).

Some of the methods and systems described above require communication, such as data exchange and/or messaging, between components executing within VM 32, and components executing outside the respective VM. Such communication may be carried out using any method known in the art of virtualization. For instance, to transmit data from a component executing in kernel mode, such as AM driver 36, to memory introspection engine 40 (see, e.g., step 316 in FIG. 8), some embodiments use a privileged instruction to transfer control of processor 12 from VM 32 to hypervisor 30. An example of such privileged instructions is VMCALL on Intel platforms, which may be used to signal to engine 40 that some data is being transferred from within VM 32. The actual data being transmitted may be placed in a predetermined section of memory shared between driver 36 and engine 40. To transmit data from memory introspection engine 40 to AM driver 36 (see, e.g., step 314 in FIG. 8, and step 336 in FIG. 9), some embodiments use an interrupt injection mechanism to signal to driver 36 that data is being transmitted from outside the respective VM. The actual data may be transferred, for instance, through the shared memory section described above.

Figure 10:
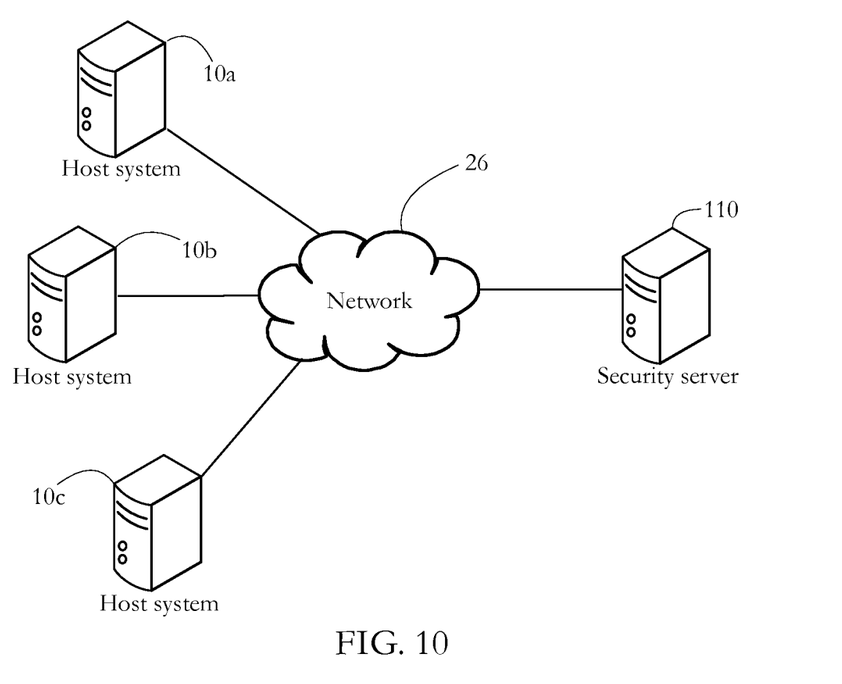
FIG. 10 illustrates an exemplary configuration comprising a plurality of host systems connected to a security server via a computer network.

In some embodiments, host system 10 may be configured to exchange security information, such as details about malware detection events, with a remote security server. FIG. 10 illustrates such an exemplary configuration, in which a plurality of host systems 10a-c are connected to a security server 110 via a computer network 26. In an exemplary embodiment, host systems 10a-c are individual computers used by employees of a corporation, while security server 110 may comprise a computer system configured by a network administrator of the respective corporation to monitor malware threats or security events occurring on systems 10a-c. In another embodiment, for instance in an Infrastructure-as-a-service (IAAS) system wherein each host system 10a-c is a server hosting tens or hundreds of virtual machines, security server 110 may comprise a computer system configured to manage anti-malware operations for all such VMs from a central location. In yet another embodiment, security server 110 may comprise a computer system configured by a provider of anti-malware software (e.g., the provider of security application 44, among others), to receive statistical and/or behavioral data about malware detected on various systems around network 26. Network 26 may include a wide-area network such as the Internet, while parts of network 26 may include local area networks (LAN).

Figure 11:
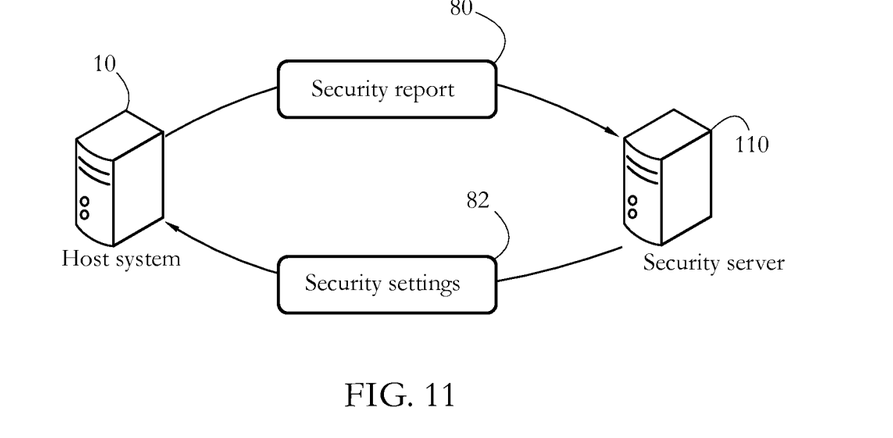
FIG. 11 shows an exemplary anti-malware transaction between a host system and a security server according to some embodiments of the present invention.

FIG. 11 shows an exemplary data exchange between host system 10 and security server 110 in an embodiment as shown in FIG. 10. Host system 10 may be configured to send a security report 80 to server 110, and to receive a set of security settings 82 from server 110. In some embodiments, security report 80 comprises process evaluation indicators and/or scores determined by process evaluators executing on host system 10, and/or aggregate scores determined by process scoring module 38, among others. Security report 80 may also comprise data identifying the respective virtual machine and evaluated processes (e.g., process IDs, names, paths, hashes, version information, or other kinds of identifiers of applications and/or processes), as well as indicators associating a process evaluation indicator/score to the VM and process for which it was determined. In some embodiments, report 80 may further comprise statistical and/or behavioral data regarding processes and/or applications executing on host system 10. System 10 may be configured to send report 80 upon detection of malware, and/or according to a schedule (e.g., every few minutes, every hour, etc.).

In some embodiments, security settings 82 may include operational parameters of process evaluators (e.g., parameters of filters 50a-c in FIG. 4), and/or parameters of process-scoring module 38. An example of an operational parameter of module 38 is the threshold for deciding whether an evaluated process is malicious (see step 308 in FIG. 5 and associated description). An exemplary operational parameter of a process evaluator is a value of a maliciousness score assigned to an evaluated process, when the evaluated process performs a certain action. For instance, an evaluated process may receive a maliciousness score of 0.1 when the respective process writes to a disk file, and a maliciousness score of 0.7 when it modifies a Windows registry value.

In some embodiments, server 110 runs an optimization algorithm to dynamically adjust such parameters to maximize malware-detection performance, for instance to increase detection rate while minimizing false positives. Optimization algorithms may receive statistical and/or behavioral data about various processes executing on the plurality of host systems 10a-c, including process evaluation indicators/scores reported to process-scoring module 38 by various process evaluators, and determine optimal values for the parameters. The values are then transmitted to the respective host systems via network 26. In some embodiments, to determine optimal parameter value, server 110 may calibrate the operation of process-scoring module 38 and/or process evaluators 50a-c using a set of processes known to be clean (not affected by malware). In an exemplary calibration scenario, security server 110 may instruct host system 10 to execute a set of calibration processes, known to be clean, and to send back to server 110 a set of process evaluation indicators/scores determined for the calibration processes. Server 110 may then determine parameter values tailored to the respective virtual machine and/or host system.

In another example, security settings 82 comprise a set of weight values used by process-scoring module 38 to determine an aggregate maliciousness score for an evaluated process according to individual process evaluation indicators received from various process evaluators. In an embodiment wherein the aggregate score is a weighted sum or a weighted average of individual scores, and wherein each score is computed according to a distinct malware detection criterion or method (for instance, when each score indicates whether an evaluated process performs a certain malware-indicative behavior), changing the weight of an individual score may effectively change the relevance of the respective criterion or method, compared to other criteria/methods. Malware threats typically occur in waves, in which a great number of computer systems worldwide are affected by the same malware agent in a short time interval. By receiving security reports 80 in real time from a plurality of host systems, security server 110 may be kept up to date with the current malware threats, and may promptly deliver optimal security settings 82 to the respective host systems, settings 82 including, for instance, a set of score weights optimized for detecting the current malware threats.

The exemplary systems and methods described above allow protecting a host system, such as a computer system, from malware such as viruses and rootkits. Conventional anti-malware systems typically execute at the processor privilege level of the operating system (e.g., kernel mode). Some malware, such as rootkits, may also operate at the level of the OS, and may thus incapacitate conventional anti-malware systems and compromise the security of the computer system. In contrast, in some embodiments of the present invention, a hypervisor executes on the computer system at the highest processor privilege level, displacing the operating system to a virtual machine. An anti-malware system operating according to some embodiments of the present invention comprises components executing within the VM and components executing outside the VM, at hypervisor level. Some anti-malware operations may thus be conducted from a processor privilege level higher than that of the operating system, where they cannot be subverted by malware executed within the VM. In some embodiments, a single memory introspection engine, executing at the level of the hypervisor, may protect multiple virtual machines executing concurrently on the respective computer system.

In some embodiments, the operation of the memory introspection engine includes selecting a set of critical software objects, such as certain drivers, libraries, registers, and page tables, among others, and preventing malicious changes to such objects. In particular, some embodiments may thus protect the anti-malware components executing within the VM from malicious attacks.

To protect such objects, some embodiments may prevent malicious changes by intercepting an attempt to write to a memory space allocated to the respective object, and blocking or redirecting the attempt. Other embodiments may protect a target object by marking the memory space allocated to the respective object as read-only. In typical hardware and software configurations, memory is partitioned into individual blocks of contiguous addresses, known as pages. In systems supporting virtualization, page access permissions are controlled by the hypervisor, for instance using dedicated data structures such as extended page tables (EPT) on Intel platforms. Thus, protecting the memory space of a target object may be achieved, for instance, by memory introspection engine instructing the hypervisor to mark a set of pages containing data belonging to the respective object as read-only.

In some embodiments, some anti-malware components execute within the protected virtual machine, collaborating with the memory introspection engine to detect malware. Such configurations may substantially simplify malware detection, by bridging a semantic gap which arises through virtualization. In typical software configurations, a malware-detecting component executing in user mode may have access to a wealth of information about the behavior of an evaluated process, whereas most of this information is not readily available to components executing at kernel level, or outside the respective VM. For instance, when an evaluated process attempts to download a file from the Internet, a user-mode process evaluator, e.g. using methods known in the art such as DLL injection, may identify which process is performing the action, may detect that the evaluated process is attempting to download a file, and may determine the IP address that the file is downloaded from, and the disk location of the downloaded file, among others. Meanwhile, a process evaluator executing at the level of the hypervisor may only detect that a set of network packets are circulating over a network adapter of the host system. Although recovering information about the behavior of the evaluated process from the level of the hypervisor may be possible in principle, such tasks may be impractical for malware detection, since they may carry a significant computational cost. By combining anti-malware components executing within the respective VM with a memory introspection engine executing outside the VM, some embodiments of the present invention may use the abundance of behavioral data that inside-VM components have access to, while protecting the integrity of such components from outside the respective VM.

In conventional anti-malware systems, a software component executing at a processor privilege level similar to that of the operating system detects when a process is being launched, and instructs other anti-malware components to monitor the behavior of the respective process. Some malware agents manage to compromise such anti-malware systems by disabling the software component detecting process launches, thus causing the anti-malware system to monitor only a subset of the currently executing processes. In contrast, in some embodiments of the present invention, the component detecting process launches is moved outside the respective virtual machine, at higher processor privilege level than the operating system. Such configurations may prevent malware from hiding from anti-malware components.

In some embodiments, a process-scoring module receives per-process evaluation indicators from a plurality of process evaluators executing either within or outside the respective VM. Process evaluation indicators received from components executing within the protected VM may indicate, for instance, that an evaluated process has performed a malware-indicative behavior, such as an attempt to modify a registry value of the OS, or an attempt to delete a file. Process evaluation indicators determined outside the respective VM may indicate, for instance, that an evaluated process is attempting to write to a protected memory section. Process evaluation indicators may comprise numerical scores indicating a degree of maliciousness of the respective process. In some embodiments, the process-scoring module determines an aggregate score according to the plurality of process evaluation indicators/scores received from various process evaluators, and determines whether the evaluated process is malicious according to the aggregate score.

It will be clear to one skilled in the art that the above embodiments may be altered in many ways without departing from the scope of the invention. Accordingly, the scope of the invention should be determined by the following claims and their legal equivalents.

What is claimed is:

1. A host system comprising at least one hardware processor configured to execute:
    a hypervisor configured to expose a virtual machine;
    a process evaluator executing within the virtual machine;
    a memory introspection engine executing outside the virtual machine; and
    a process-scoring module, wherein:
    the process evaluator is configured to:
    determine whether an evaluated process executing within the virtual machine performs an action and
    in response, when the evaluated process performs the action, transmit a first process evaluation indicator to the process-scoring module, the first process evaluation indicator determined for the evaluated process;
    the memory introspection engine is configured to:
    intercept a call to an operating system function, to detect a launch of a protected process executing within the virtual machine, wherein the operating system function is configured to add the protected process to a list of processes executing within the virtual machine, and in response to detecting the launch,
    determine whether the evaluated process attempts to modify a memory page of the protected process, and
    in response, when the evaluated process attempts to modify the memory page, transmit a second process evaluation indicator to the process-scoring module, the second process evaluation indicator determined for the evaluated process; and
    the process-scoring module is configured to:
    receive a first weight and a second weight from a security server configured to perform anti-malware transactions with a plurality of computer systems including the host system, receive the first and second process evaluation indicators, and
    in response, determine whether the evaluated process is malicious according to the first and second process evaluation indicators, wherein determining whether the evaluated process is malicious comprises determining a weighted sum of a first score and a second score, the first weight multiplying the first score in the weighted sum, and the second weight multiplying the second score in the weighted sum, wherein the first and second scores are determined according to the first and second process evaluation indicators, respectively.

2. The host system of claim 1, wherein the memory introspection engine is further configured to:
    in response to detecting the launch of the protected process, send an indicator of the protected process to a security application executing within the virtual machine, and in response, receive from the security application an indicator of the memory page.

3. The host system of claim 1, wherein the process evaluator comprises a user-level process evaluator executing at user level of processor privilege, the user-level process evaluator configured to determine whether the evaluated process performs the action.

4. The host system of claim 1, wherein the process evaluator comprises a kernel-level process evaluator executing at kernel level of processor privilege, the kernel-level process evaluator configured to determine whether the evaluated process performs the action.

5. The host system of claim 1, wherein the process evaluator comprises a system call evaluator configured to intercept a system call performed by the evaluated process.

6. The host system of claim 1, wherein the process-scoring module executes within the virtual machine.

7. The host system of claim 1, wherein the process-scoring module executes outside the virtual machine.

8. The host system of claim 1, wherein the protected process includes the process scoring module.

9. The host system of claim 1, wherein the protected process forms a part of a security application comprising the process evaluator.

10. A non-transitory computer-readable medium encoding instructions which, when executed on a host system comprising at least one processor, cause the host system to form:
    a hypervisor configured to expose a virtual machine;
    a process evaluator executing within the virtual machine;
    a memory introspection engine executing outside the virtual machine; and
    a process-scoring module, wherein:
    the process evaluator is configured to:
    determine whether an evaluated process executing within the virtual machine performs an action, and
    in response, when the evaluated process performs the action, transmit a first process evaluation indicator to the process-scoring module, the first process evaluation indicator determined for the evaluated process;

the memory introspection engine is configured to:
intercept a call to an operating system function, to detect a launch of a protected process executing within the virtual machine, wherein the operating system function executes within the virtual machine and is configured to add the protected process to a list of processes executing within the virtual machine, and
in response to detecting the launch,
determine whether the evaluated process attempts to modify a memory page of the protected process, and
in response, when the evaluated process attempts to modify the memory page, transmit a second process evaluation indicator to the process-scoring module, the second process evaluation indicator determined for the evaluated process; and
the process-scoring module is configured to:
receive a first weight and a second weight from a security server configured to perform anti-malware transactions with a plurality of computer systems including the host system, receive the first and second process evaluation indicators, and
in response, determine whether the evaluated process is malicious according to the first and second process evaluation indicators, wherein determining whether the evaluated process is malicious comprises determining a weighted sum of a first score and a second score, the first weight multiplying the first score in the weighted sum, and the second weight multiplying the second score in the weighted sum, wherein the first and second scores are determined according to the first and second process evaluation indicators, respectively.

11. The non-transitory computer-readable medium of claim 10, wherein the memory introspection engine is further configured to:
in response to detecting the launch of the protected process, send an indicator of the protected process to a security application executing within the virtual machine, and
in response, receive from the security application an indicator of the memory page.

12. The non-transitory computer-readable medium of claim 10, wherein the process evaluator comprises a user-level process evaluator executing at user level of processor privilege, the user-level process evaluator configured to determine whether the evaluated process performs the action.

13. The non-transitory computer-readable medium of claim 10, wherein the process evaluator comprises a kernel-level process evaluator executing at kernel level of processor privilege, the kernel-level process evaluator configured to determine whether the evaluated process performs the action.

14. The non-transitory computer-readable medium of claim 10, wherein the process evaluator comprises a system call evaluator configured to intercept a system call performed by the evaluated process.

15. The non-transitory computer-readable medium of claim 10, wherein the process-scoring module executes within the virtual machine.

16. The non-transitory computer-readable medium of claim 10, wherein the process-scoring module executes outside the virtual machine.

17. The non-transitory computer-readable medium of claim 10, wherein the protected process includes the process-scoring module.

18. The non-transitory computer-readable medium of claim 10, wherein the protected process forms a part of a security application configured to execute the process evaluator.

19. A method comprising:
employing at least one hardware processor of a host system to receive a first weight and a second weight from a security server configured to perform anti-malware transactions with a plurality of computer systems including the host system;
employing the at least one hardware processor to receive a first process evaluation indicator determined for an evaluated process, the evaluated process executing within a virtual machine exposed by a hypervisor executing on the host system, wherein determining the first process evaluation indicator comprises employing a process evaluator executing within the virtual machine to determine whether the evaluated process performs a first action;
employing the at least one hardware processor to receive a second process evaluation indicator determined for the evaluated process, wherein determining the second process evaluation indicator comprises employing a memory introspection engine executing outside the virtual machine to determine whether the evaluated process performs a second action; and
in response to receiving the first and second process evaluation indicators, employing the at least one hardware processor to determine whether the evaluated process is malicious according to the first and second process evaluation indicators, wherein determining whether the evaluated process is malicious comprises determining a weighted sum of a first score and a second score, the first weight multiplying the first score in the weighted sum, and the second weight multiplying the second score in the weighted sum, wherein the first and second scores are determined according to the first and second process evaluation indicators, respectively.

20. A method comprising:
employing at least one hardware processor of a host system to receive a first weight and a second weight from a security server configured to perform anti-malware transactions with a plurality of computer systems including the host system;
employing the at least one hardware processor to execute a memory introspection engine, the memory introspection engine executing outside a virtual machine exposed by a hypervisor executing on the host system, wherein executing the memory introspection engine comprises detecting a launch of a process executing within the virtual machine;
in response to the memory introspection engine detecting the launch of the process, employing the at least one hardware processor to determine a first and a second process evaluation indicators of the process; and
in response to determining the first and second evaluation indicators, employing the at least one hardware processor to determine whether the process is malicious according to the first and second process evaluation indicators, wherein determining whether the evaluated process is malicious comprises determining a weighted sum of a first score and a second score, the first weight multiplying the first score in the weighted sum, and the second weight multiplying the second score in the weighted sum, wherein the first and second scores are determined according to the first and second process evaluation indicators, respectively.

* * * * *